(12) United States Patent
Kim et al.

(10) Patent No.: US 11,103,817 B2
(45) Date of Patent: Aug. 31, 2021

(54) CARTRIDGE FILTER USING NANOFIBER COMPOSITE FIBER YARN AND METHOD FOR MANUFACTURING SAME

(71) Applicant: AMOGREENTECH CO., LTD., Gimpo-si (KR)

(72) Inventors: Chan Kim, Gwangju (KR); Seung Hoon Lee, Paju-si (KR); Seon Ho Jang, Seoul (KR); Jun Keun Cho, Suwon-si (KR); Jong Su Seok, Suwon-si (KR); Yun Mi So, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 221 days.

(21) Appl. No.: 16/064,155

(22) PCT Filed: Nov. 17, 2016

(86) PCT No.: PCT/KR2016/013253
§ 371 (c)(1),
(2) Date: Jun. 20, 2018

(87) PCT Pub. No.: WO2017/111317
PCT Pub. Date: Jun. 29, 2017

(65) Prior Publication Data
US 2019/0001247 A1    Jan. 3, 2019

(30) Foreign Application Priority Data
Dec. 22, 2015 (KR) ................. 10-2015-0183575

(51) Int. Cl.
*B01D 39/02* (2006.01)
*B01D 39/16* (2006.01)
(Continued)

(52) U.S. Cl.
CPC .......... *B01D 39/02* (2013.01); *B01D 24/008* (2013.01); *B01D 24/165* (2013.01); *B01D 27/06* (2013.01);
(Continued)

(58) Field of Classification Search
None
See application file for complete search history.

(56) References Cited

U.S. PATENT DOCUMENTS

| 5,591,335 A | 1/1997 | Barboza et al. |
| 2010/0139224 A1* | 6/2010 | Lim ........................ D04H 3/033 55/486 |

(Continued)

FOREIGN PATENT DOCUMENTS

| JP | 2011214170 | 10/2011 |
| KR | 200186206 | 6/2000 |

(Continued)

OTHER PUBLICATIONS

Machine Translation of JP2011214170A (Year: 2011).*
International Search Report—PCT/KR2016/013253 dated Feb. 21, 2017.

*Primary Examiner* — Clare M Perrin
(74) *Attorney, Agent, or Firm* — Cantor Colburn LLP

(57) ABSTRACT

Provided is a cartridge filter using nanofiber composite fiber yarn, the cartridge filter including: a core having a plurality of holes through which a liquid passes; and a filter medium wound around the core to collect an object to be filtered contained in the liquid, wherein the filter medium comprises composite fiber yarn in which a nanofiber web which is produced by accumulating nanofibers produced by an electrospinning method is laminated to a porous nonwoven fabric, to thus provide excellent durability and improved filtration performance.

6 Claims, 9 Drawing Sheets

(51) Int. Cl.
*D02G 3/44* (2006.01)
*D04H 1/728* (2012.01)
*D02G 3/26* (2006.01)
*B01D 24/16* (2006.01)
*B01D 29/01* (2006.01)
*B01D 24/00* (2006.01)
*B01D 27/06* (2006.01)
*B01D 29/00* (2006.01)
*B01D 24/10* (2006.01)
*B01D 24/12* (2006.01)

(52) U.S. Cl.
CPC ............ *B01D 29/016* (2013.01); *B01D 39/16* (2013.01); *B01D 39/1623* (2013.01); *D02G 3/26* (2013.01); *D02G 3/447* (2013.01); *D04H 1/728* (2013.01); *B01D 24/10* (2013.01); *B01D 24/12* (2013.01); *B01D 29/0022* (2013.01); *B01D 2239/025* (2013.01); *B01D 2239/0631* (2013.01); *B01D 2239/0695* (2013.01); *B01D 2239/10* (2013.01); *B01D 2239/1216* (2013.01); *D10B 2505/04* (2013.01)

(56) References Cited

U.S. PATENT DOCUMENTS

2013/0118973 A1\* 5/2013 Seo .................... B01D 29/0093
 210/435
2013/0193061 A1\* 8/2013 Kristiansen ............ B65H 81/08
 210/457

FOREIGN PATENT DOCUMENTS

| KR | 20120002491 | 1/2012 |
| KR | 20120078147 | 7/2012 |
| KR | 20150122282 | 11/2015 |

\* cited by examiner

CARTRIDGE FILTER USING NANOFIBER COMPOSITE FIBER YARN AND METHOD FOR MANUFACTURING SAME

TECHNICAL FIELD

The present invention relates to a cartridge filter using nanofiber composite fiber yarn comprising nanofibers prepared by an electrospinning method and a method of manufacturing the same.

BACKGROUND ART

As the industry becomes more sophisticated and complicated, various types of liquid filters are required, and the demand for cartridge filters for microfiltration, which enable easy attachment and detachment, has been greatly increased. Cartridge filters for microfiltration are widely used as process filters in all industrial fields such as electronic materials of semiconductors, etc., automobile industry, food and beverage manufacturing, various pigment and paint industries, wastewater and water purification.

Liquid filtration filters are manufactured by various materials and methods, and can be classified into surface filtration (screen filtration) and depth filtration depending on the site where the contaminant particles to be filtered are filtered. In the surface filtration, particle filtration occurs on the filter surface depending on the pore size of the filter, and in the deep filtration, filtration is generated by collecting the particles on the irregularly arranged fibrous aggregate along the depth direction having a density gradient. Deep filtration is widely used as a pre-filter of surface filtration due to relatively long use time and treatment capacity in a filtration process with high particle concentration and viscosity although filtration efficiency is not uniform due to uneven size of pores as compared with surface filtration.

A cartridge filter is formed as a circular housing shape in which a central perforated core is surrounded by a number of filter media. The flow of the fluid flows from the outside of the filter through the filter medium to the inside or outside of the core at the center of the filter. Here, floating solid matters accumulate between the outer surfaces of the filter element and, in the case of depth filtration, between the gaps in the filter medium, and thus a removal function of the floating solid matters takes place. In addition, the cartridge filter can be easily replaced with another by opening the housing.

The cartridge filter element may be largely manufactured in the form of accessories such as rings, discs, fiber yarns, and the like, and the fiber yarn filter media may be manufactured in the semi-finished or finished product state.

The cartridge filters manufactured in the form of accessories can perform a filtration function when the product is assembled in the state of finished product. The product manufactured in the form of rings is assembled in a stacked form with a narrow space between the rings. The product manufactured in the form of fiber yarn is formed of successive layers of windings wound around the central core at a slight angle on each layer.

In the case of filter media, there is a form in which the filter yarn media are made to have a uniform size so as to coincide with the core inside the center of the elements. Thus, products made in the form of staple fiber nonwoven fabrics, filament yarn spun-bonded nonwoven fabrics, or membranes may be cut to a certain size while retaining a suitable protective mesh material, or maintained in a corrugated form or is wound around a central core.

In some cases, the cartridge filter element is manufactured when a mixed material of the filter and the resin is sprayed to have a thickness necessary for the core surface, and then the resin is heated to thus be produced as a resin-bonded cartridge. There is also a method in which fibers directly spun by a melt-blown method are spirally wound while rotating to form a cylindrical filter.

The cartridge filter consists of a central core component, a filter component with supporting meshes and spacers, and an end cap component.

Yarn or string winding elements are most common in liquid filtration processes and have the advantage of performing a filtering function in spaces between individual fibers formed of fiber yarn as well as spaces between individual fiber yarn. In spite of this popularity, however, there are disadvantages such as uneven porosity, and especially the transfer of fiber yarn fragments to treated water. In addition, since conventional synthetic fibers and natural fibers have a diameter of several to several tens of micrometers ($\mu m$), they cannot increase the filtration area within the same volume due to the limitation of the surface area when manufacturing the filament fiber yarn. Therefore, there are some limitations on the removal efficiency of the filter and the amount of collection (filter life), and the price is relatively inexpensive.

Research and development on the electrospinning method of producing a fiber with a limited diameter of less than 1 $\mu m$, which is the conventional fiber manufacturing method, such as melt spinning or solution spinning, by applying an electric field to the polymer melt. The nanofibers produced by such electrospinning facilitate the use as a wide variety of materials and an easy pore control, to thereby provide their limitless applicability. However, the nanofibers are manufactured as only web-type thin film nonwoven fabrics despite their limitless applicability, and thus there have been limitations in application due to the low mechanical strength and the limited handling performance.

Particularly, when the nanofiber is applied as a filter, it is used as an element for a liquid filter which is complexed with a nonwoven fabric or made into a multilayer structure and has a filtration area increased by a spiral wound filter or a pleated filter. However, when the nanofibers are applied in the form of nonwoven fabrics, surface filtration due to the surface pore structure of the nanofiber is increased. As a result, when the filtration area is increased in the form of a spiral wound filter or a pleated filter, the efficiency is excellent but the pressure loss is caused to thereby cause an increase of the operating cost of the overall filter system.

In addition, when excessive pressure is generated in the filter system, and when the water pressure is increased, a space is formed at the portion where the fusion between the nanofibers does not occur, or a stretching occurs between the fibers. Therefore, there is a possibility that a space larger than the object to be filtered may be formed and surface filtration may not be performed.

A conventional depth filter for liquid filtration is composed of a bicomponent composite fiber nonwoven fabric as disclosed in Korean Patent Application Publication No. 10-2012-0078147 (published on Jul. 10, 2012), and includes a cylindrical core located at the inner center of the core, and a laminate around which a filter material composed of a support and a nonwoven fabric is wound.

Such a depth filter for liquid filtration has a problem that it is difficult to perform precise filtering because it is difficult to produce an average pore size of less than 1 $\mu m$ due to the nature of the nonwoven fabric, since a filter member formed of a support and a nonwoven fabric is wound around the core.

DISCLOSURE

Technical Problem

Accordingly, an object of the present invention is to provide a multilayer cartridge filter using nanofiber composite fiber yarns capable of precise filtering and a method of manufacturing the same, in which a nanofiber web produced by an electrospinning method is laminated on a porous substrate to produce composite fiber yarns, and the composite fiber yarns are wound on a core to maintain an average pore size of less than 1 µm.

Another object of the present invention is to provide a multilayer cartridge filter using nanofiber composite fiber yarn capable of improving the filter efficiency and extending the filter life by manufacturing a filter based on nanofibers produced by an electrospinning method, and a method of manufacturing the same.

Another object of the present invention is to provide a multilayer cartridge filter using nanofiber composite fiber yarn capable of greatly increasing a filtration area by using a space between fiber yarn and a space between nanofibers by using composite fiber yarn in which nanofibers are twisted, and improving a collection amount, and a manufacturing method thereof.

Another object of the present invention is to provide a multilayer cartridge filter using nanofiber composite fiber yarn which can improve the performance and life of a conventional filter by winding nanofiber-based composite fiber yarn on a conventional depth filtration filter.

Technical Solution

According to an aspect of the present invention, there is provided a cartridge filter comprising: a core having a plurality of holes through which a liquid passes; and a filter medium wound around the core to collect an object to be filtered contained in the liquid, wherein the filter medium comprises composite fiber yarn in which a nanofiber web which is produced by accumulating nanofibers produced by an electrospinning method is laminated to a porous nonwoven fabric.

The composite fiber yarn may use nanofiber composite fiber yarn having an average pore size of less than 1 µm.

The composite fiber yarn can be manufactured by slitting a nanofiber composite membrane which is formed by laminating a nanofiber web having nanofibers accumulated therein on a porous substrate to produce nanofiber tape yarn, and twisting a plurality of strands of the nanofiber tape yarn.

The plurality of filter media having a different average pore size may be stacked on one another and used as the filter medium, and the filter media having a larger average pore size may be stacked as the plurality of filter media may be wound closer to the core.

The filter medium may include a porous member wound on an outer surface of the core, and composite fiber yarn wound on an outer surface of the porous member wherein the nanofiber web which is produced by accumulating the nanofibers produced by the electrospinning method is laminated on the porous nonwoven fabric.

The porous member may be one of PP, PE, PP/PE, PET, a natural fiber, a glass fiber, and acrylic fiber yarn.

The filter medium may include a porous member wound on an outer surface of the core, a first nonwoven fabric wound on an outer surface of the porous member, and composite fiber yarn wound on an outer surface of the first nonwoven fabric wherein the nanofiber web which is produced by accumulating the nanofibers produced by the electrospinning method is laminated on the porous nonwoven fabric.

The first nonwoven fabric may be a spun bond nonwoven fabric or a thermal bond nonwoven fabric to be formed in a web shape by spinning any one of PP, PE, PP/PE and PET.

The filter medium may include a porous member wound on an outer surface of the core, a first nonwoven fabric wound on an outer surface of the porous member, a second nonwoven fabric wound on an outer surface of the first nonwoven fabric, and composite fiber yarn wound on an outer surface of the second nonwoven fabric wherein the nanofiber web which is produced by accumulating the nanofibers produced by the electrospinning method is laminated on the porous nonwoven fabric.

The second nonwoven fabric may be a meltblown nonwoven fabric formed by spinning a synthetic polymer.

According to another aspect of the present invention, there is provided a method of manufacturing a cartridge filter, the method comprising: the steps of: preparing nanofibers by an electrospinning method and accumulating the nanofibers to form a nanofiber web; forming a nanofiber composite membrane by laminating the nanofiber web and a porous nonwoven fabric; slitting the nanofiber composite membrane to produce nanofiber tape yarn; false-twisting the nanofiber tape yarn to produce composite fiber yarn; and winding the composite fiber yarn on a core.

The method may further include a post-treatment step of hot-stretching or heat-setting to prevent the twist of the composite fiber yarn from being released.

The nanofiber web may be calendered to bind the nanofibers to form a fixed pore structure.

The method of manufacturing the nanofiber tape yarn includes: firstly slitting a nanofiber composite membrane to produce a slitting roll; and secondly precision slitting the slitting roll to produce nanofiber tape yarn having a width smaller than that of the slitting roll.

Advantageous Effects

As described above, in the multilayer cartridge filter according some embodiments of the present invention, a nanofiber web produced by an electrospinning method is laminated on a porous substrate to produce composite fiber yarn, and the composite fiber yarn is wound on the core in multiple layers to maintain an average pore size of less than 1 µm, to thus enable precise filtering.

Also, it is possible to improve the filter efficiency and extend the filter life based on nanofibers produced by the electrospinning method.

Further, by using the composite fiber yarn in which the nanofibers are twisted, the filtration area can be drastically increased by using the space between the fiber yarn and the space between the nanofibers, and the collection amount can be improved.

In addition, the performance and life of conventional filtration filter can be improved by winding nanofiber-based composite fiber yarn on a conventional depth filtration filter.

BEST MODE

Figure 1:
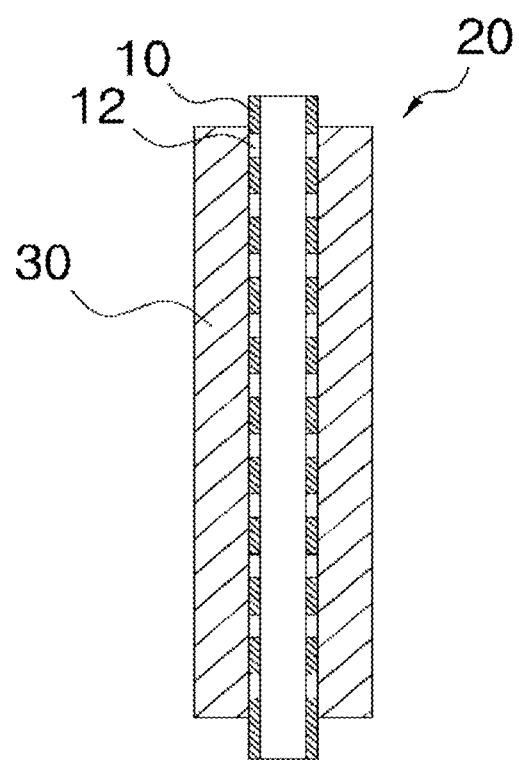
FIG. 1 is a cross-sectional view of a cartridge filter according to a first embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

FIG. 1 is a cross-sectional view of a cartridge filter according to a first embodiment of the present invention.

Referring to FIG. 1, a cartridge filter according to a first embodiment of the present invention includes a core 10 in which a plurality of holes 12 through which a liquid can pass are formed, and a fiber yarn type filter medium 20 wound around the core 10, and for collecting a filtration object included in the liquid.

The core 10 may have a cylindrical shape. A cover may be mounted on either open end of the core 10, and the cover may be formed with a discharge port through which the filtered liquid is discharged.

Figure 2:
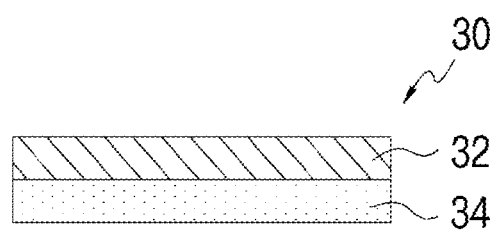
FIG. 2 is a cross-sectional view of composite fiber yarn according to the first embodiment of the present invention.

As shown in FIG. 2, the filter medium 20 includes composite fiber yarn 30 which is produced by accumulating nanofibers produced by an electrospinning method to form a nanofiber web 32, and laminating the nanofiber web 32 on a porous nonwoven fabric 34.

In more detail, nanofibers are prepared by an electrospinning method and the nanofibers are accumulated to form a nanofiber web 32 having an average pore size of less than 1 μm. Then, the nanofiber web 32 is laminated on a porous nonwoven fabric 34 to form a nanofiber composite membrane. The nanofiber composite membrane thus formed is slit to produce nanofiber tape yarn, and a plurality of strands of the nanofiber tape yarn are twisted to form composite fiber yarn 30.

The porous nonwoven fabric 34 may be any one of a melt-blown nonwoven fabric, a spun bond nonwoven fabric, a thermal bond nonwoven fabric, a chemical bond nonwoven fabric, and a wet-laid nonwoven fabric.

The nanofiber web 32 is prepared by mixing an electrospinnable polymer material and a solvent at a predetermined ratio to prepare a spinning solution, spinning the spinning solution by an electrospinning method to produce nanofibers, and accumulating the nanofibers to have micropores.

The polymeric material used in some embodiments of the present invention may employ, for example, synthetic and natural polymers which can be electrospun. One or more of these polymers may be used in combination.

Polyacrylonitrile (PAN), polyvinylidene fluoride (PVdF), polyester sulfone (PES), polystyrene (PS), polyvinyl chloride (PVC), and poly carbonate (PC), polyurethane (PU), or the like may be particularly preferably used, independently alone. Otherwise, a mixture of polyvinylidene fluoride (PVdF) and polyacrylonitrile (PAN), a mixture of PVdF and PES, and a mixture of PVdF and thermoplastic polyurethane (TPU), PVC, PC and the like may be used thereas.

As a spinning method to be applied to some embodiments of the present invention, there may be used a nozzle mounted upstream type, a nozzle mounted downstream type, or a nozzleless type which can spin without any nozzle, or there may be used any one of electrospinning, centrifugal electrospinning, air electrospinning, flash electrospinning, pulsed electrospinning and bubble electrospinning.

Since the nanofiber web 32 is manufactured by the electrospinning method, the thickness of the nanofiber web 32 is determined according to the amount of the spun polymer material. Accordingly, there is an advantage that it is easy to make the thickness of the nanofiber web 32 to a desired thickness. That is, if the amount of the spun polymer material is reduced, the thickness of the nanofiber web 32 can be reduced.

Accordingly, since the number of the pores and the average size of the pores are determined according to the thickness of the nanofiber web 32, the filtering precision can be adjusted by adjusting the thickness of the nanofiber web 32 to various thicknesses according to the purpose of the cartridge filter.

The diameters of the nanofibers are preferably in the range of 0.1 μm to 1.0 μm, and the average pore size is preferably less than 1 μm.

Figure 3:
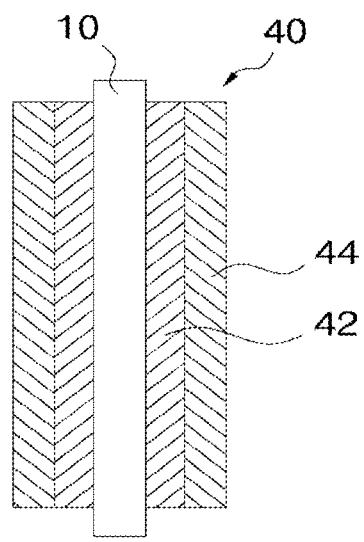
FIG. 3 is a cross-sectional view of a cartridge filter according to a second embodiment of the present invention.

Referring to FIG. 3, a cartridge filter according to a second embodiment includes a core 10 in which a plurality of holes 12 through which a liquid can pass are formed, and a filter material 40 that is wound on the outer surface of the core 10 to collect a filtration object to be contained in the liquid and is stacked with a plurality of layers.

The filter medium 40 according to the second embodiment is the same as the filter medium 20 described in the first embodiment except that a plurality of filter media having different average pore sizes are sequentially stacked on the outer surface of the core 10. That is, since the nanofiber web 32 according to the embodiment of the present invention can be produced in different average pore sizes, a plurality of filter media having different average pore sizes of the nanofiber webs 32 are produced, and then sequentially laminated on the core 10.

For example, the filter medium 40 may include a first filter medium 42 laminated on an outer surface of the core 10, and a second filter medium 44 laminated on an outer surface of the first filter medium 42. Here, the average pore size of the first filter medium 42 is larger than the average pore size of the second filter medium 44. That is, the first filter medium 42 wound near the core 10 has a large average pore size and the second filter medium 44 wound farther from the core 10 has a small average pore size. Thus, the average pore size of the filter medium gradually decreases as the distance between the core 10 and the filter medium increases.

The filter medium 40 according to the second embodiment can improve the collection performance of the filtration object by sequentially laminating a plurality of filter media having different average pore sizes on the core 10.

Figure 4:
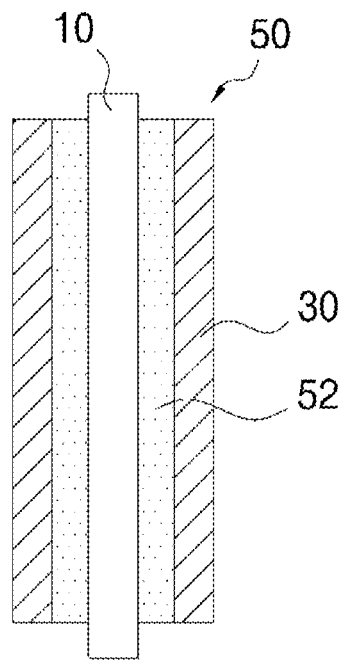
FIG. 4 is a cross-sectional view of a cartridge filter according to a third embodiment of the present invention.

Referring to FIG. 4, a filter medium 50 according to a third embodiment includes a porous member 52 that is wire-wound on the outer surface of a core 10 and composite fiber yarn 30 that is wound on an outer surface of the porous member 52 and is produced by laminating a nanofiber web 32 which is formed by accumulating nanofibers that are prepared by an electrospinning method on a porous nonwoven fabric 34.

The composite fiber yarn 30 in the third embodiment is the same as the composite fiber yarn 30 described in the first embodiment and the porous member 52 may include any one of PP, PE, PE/PP, PET, a natural fiber, a glass fiber, and an acryl fiber.

As described above, the filter medium 50 according to the third embodiment can strengthen the strength of the filter medium by laminating the porous member 52 on the inner surface of the composite fiber yarn 30.

Figure 5:
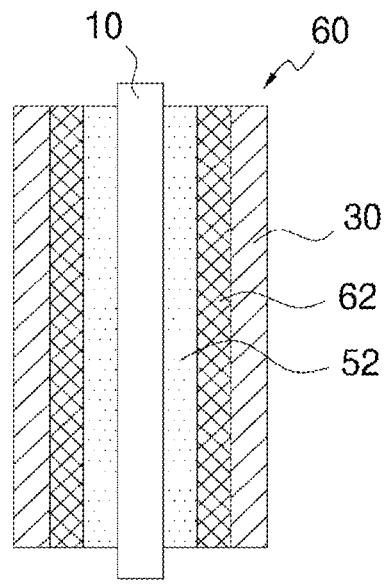
FIG. 5 is a cross-sectional view of a cartridge filter according to a fourth embodiment of the present invention.

Referring to FIG. 5, a filter medium 60 according to a fourth embodiment includes a porous member 52 wound on an outer surface of a core 10, a first nonwoven fabric 62 wound on an outer surface of the porous member 52, and composite fiber yarn 30 wound on an outer surface of the first nonwoven fabric 62.

The porous member 52 and the composite fiber yarn 30 described in the fourth embodiment are the same as the porous member 52 and the composite fiber yarn 30 described in the third embodiment.

Here, the first nonwoven fabric 62 may be a spun bond nonwoven fabric or a thermal bond nonwoven fabric to be formed in a web shape, by spinning any one of PP, PE, PP/PE and PET.

Figure 6:
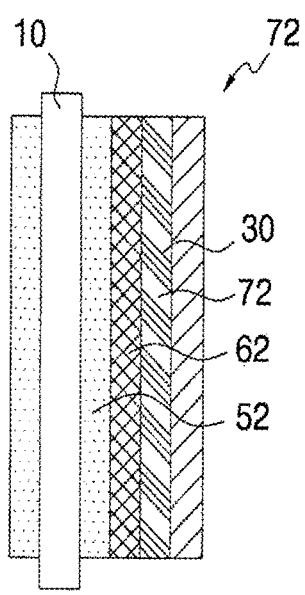
FIG. 6 is a cross-sectional view of a cartridge filter according to a fifth embodiment of the present invention.

Referring to FIG. 6, a filter medium 70 according to a fifth embodiment includes a porous member 52 wound on an outer surface of a core 10, a first nonwoven fabric 62 wound on an outer surface of the porous member 52, a second nonwoven fabric 72 wound on an outer surface of the first nonwoven fabric 62, and composite fiber yarn 30 wound on an outer surface of the second nonwoven fabric 72 and formed by laminating a nanofiber web 32 which is formed by accumulating nanofibers that are prepared by an electrospinning method on a porous nonwoven fabric 34.

Here, the first nonwoven fabric 62 may be a spun bond nonwoven fabric or a thermal bond nonwoven fabric formed in the form of a web by spinning any one of PP, PE, PE/PP, and PET, and the second nonwoven fabric 72 may be a meltblown nonwoven fabric formed by spinning a synthetic polymer.

The method of producing the composite fiber yarn according to some embodiments of the present invention as constructed above will be described below.

Figure 7:
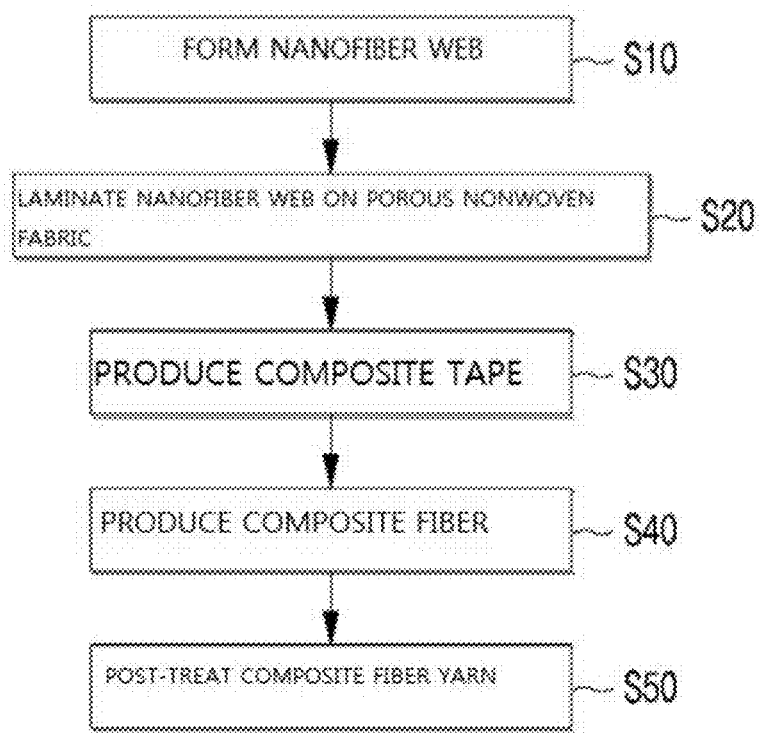
FIG. 7 is a flow chart view showing a method of producing composite fiber yarn of a cartridge filter according to another aspect of the present invention.

FIG. 7 is a flow chart showing the method for producing composite fiber yarn according an embodiment of the present invention.

First, a nanofiber web 32 is formed by electrospinning (S10).

A polymer material and a solvent are mixed at a certain ratio to prepare an electrospinnable spinning solution. Here, the polymer material is not particularly limited as long as it is a polymer in which nanofibers are formed by electrospinning a thermosetting polymer or a thermoplastic polymer.

The content of the polymer material in the preparation of the spinning solution is suitably about 5 wt % to about 50 wt %. When the content of the polymer material is less than 5 wt %, the nanofibers are not formed but are sprayed in a bead form, and thus it is difficult to form a membrane. Meanwhile, when the content of the polymer material exceeds 50 wt %, the viscosity of the spinning solution is too high, and thus the spin ability is poor to cause it difficult to form fibers. Therefore, although there is no particular restriction on the preparation of the spinning solution, it is preferable to control the morphology of the fiber at a concentration in which it is easy to form a fibrous structure.

The spinning solution is transported to a spin pack, where a high voltage device is used to apply a voltage to the spin pack to perform electrospinning. In this case, the voltage used can be adjusted from 0.5 KV to 100 KV, and the collector can be grounded or charged with the negative (−) polarity. In the case of the collector, it is advisable to use a suction collector in order to smooth focusing of fibers during spinning.

It is also preferable to adjust the distance between the spin pack and the collector to 5 cm to 50 cm. It is preferable that a discharge amount during spinning should be uniformly discharged and spun by using a metering pump, and the spinning is performed under an environment of a relative humidity of 30% to 80% in a chamber capable of controlling temperature and humidity during spinning.

In some embodiments of the present invention, a nanofiber web 32 is formed by electrospinning, by using an electrospinning method, the spinning solution from the spin pack on one surface of a transfer sheet which is conveyed along the lower collector and accumulating the nanofibers. The nanofiber web 32 collected on the transfer sheet has three-dimensional micropores, by accumulating the nanofibers.

When the thin film nanofiber web alone is used, the handling property is poor, and the tensile strength is low, so that it is difficult to carry out the drying, calendering and rolling processes while being transported at a high speed. Further, it is difficult to carry out the subsequent process at high speed and continuously after the production of the nanofiber web, but when using the above-mentioned transfer sheet, the processing speed can be greatly improved by providing a sufficient tensile strength.

The thus-produced nanofiber web may be calendered to bind the nanofibers to form a fixed pore structure. Here, calendering is performed at a temperature of 100° C. to 200° C. under a condition of 0.5 Kgf/cm² to 1.5 Kgf/cm².

The nanofiber web 32 is laminated on the porous nonwoven fabric 34 to produce a nanofiber composite membrane (S20).

The nanofiber web 32 is laminated on the porous nonwoven fabric 34 by various methods such as compression, rolling, thermal bonding, ultrasonic bonding, calender bonding, etc., to produce a nanofiber composite membrane having a basis weight of 0.5 gsm to 100 gsm.

In addition, lamination can be carried out with heat treatment, and preferably carried out at a temperature in the range of 20° C. to 250° C. in which the polymer used is not melted. When the temperature is less than 50° C., the heat treatment temperature is too low, so that the fusion between the nanofiber web and the porous nonwoven fabric is unstable, and thus there is a high possibility that slitting does not proceed smoothly in the subsequent production of composite fiber tape yarn. Also, when the heat treatment temperature exceeds 250° C., it is undesirable that there is a high possibility that the polymer constituting the nanofiber is melted and thus the fibrous structure is lost.

After the production of the nanofiber composite membrane is completed, the nanofiber composite membrane is slit to produce nanofiber tape yarn (S30).

Figure 8A:
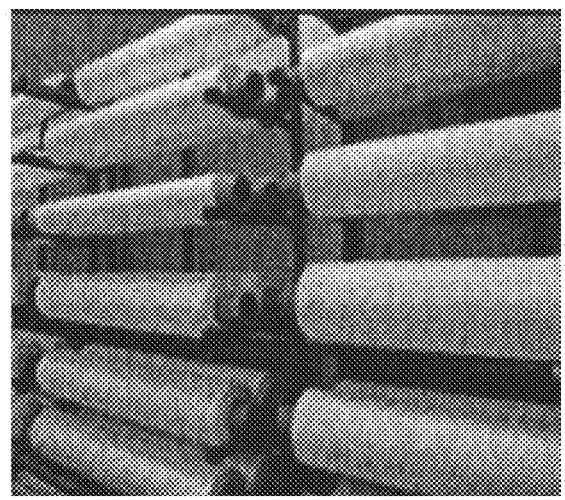
FIG. 8A is a photograph showing rolls that are obtained by rolling a nanofiber composite membrane.

As shown in FIG. 8A, the nanofiber composite membrane is wound on a roll and produced in a roll shape. Here, the width of the nanofiber composite membrane manufactured into a roll shape can be variously manufactured from 500 mm to 2,000 mm according to the spinning apparatus, but the length is about 500 M or so.

Figure 8B:
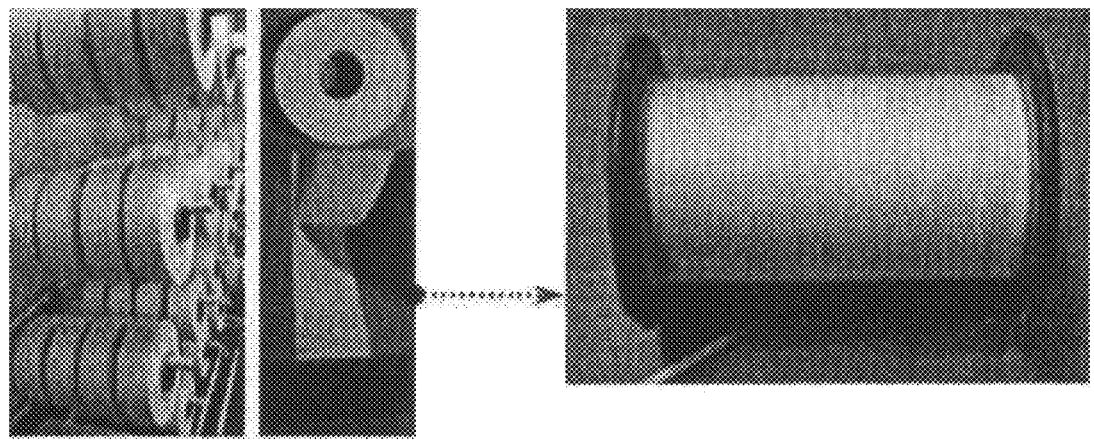
FIG. 8B is a photograph showing a first slitting process of the nanofiber composite membrane.

The roll-shaped nanofiber composite membrane is primarily slit together with the bobbin to meet the width of a precision slitter to form a plurality of slitting rolls as shown in FIG. 8B.

The plurality of slitting rolls formed by the primary slitting are subjected to a secondary slitting operation in the precision slitter such as a cutter or a slitter to produce composite fiber tape yarn having a width of 0.1 mm to 5 mm.

Figure 8C:
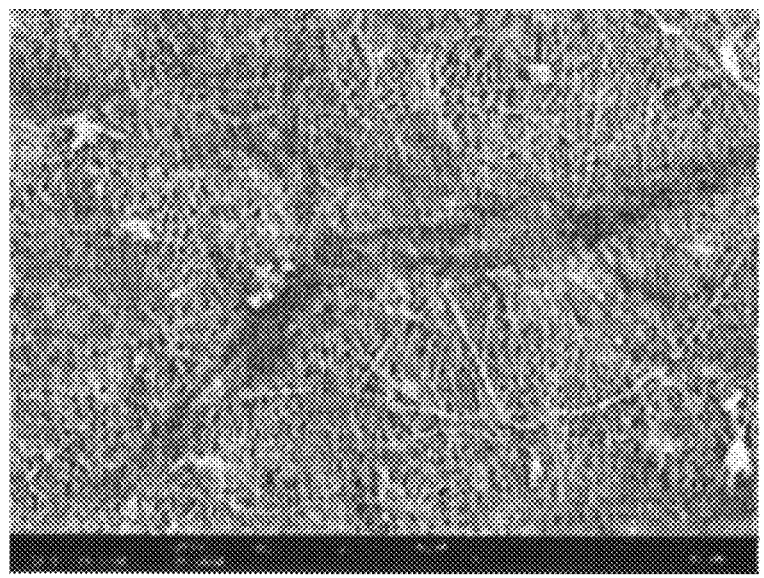
FIGS. 8C and 8D are photographs showing nanofiber tape yarn taken by a scanning electron microscope.
Figure 8D:
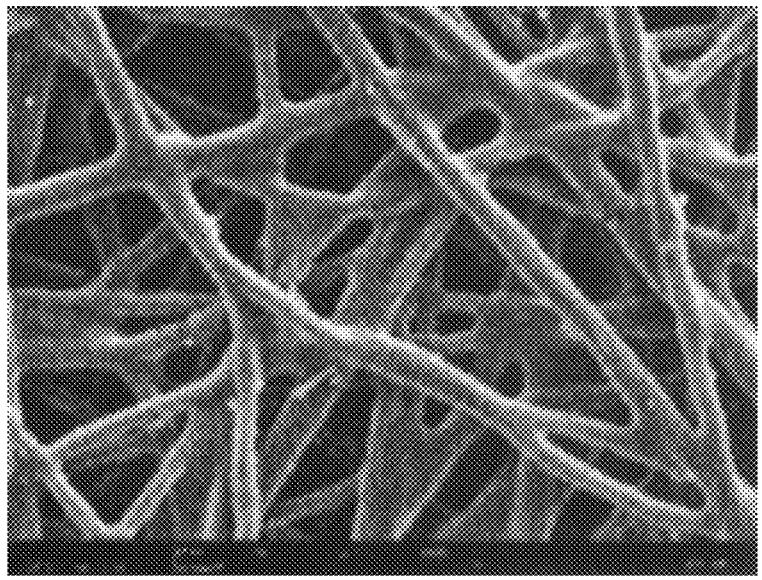
Figure 8E:
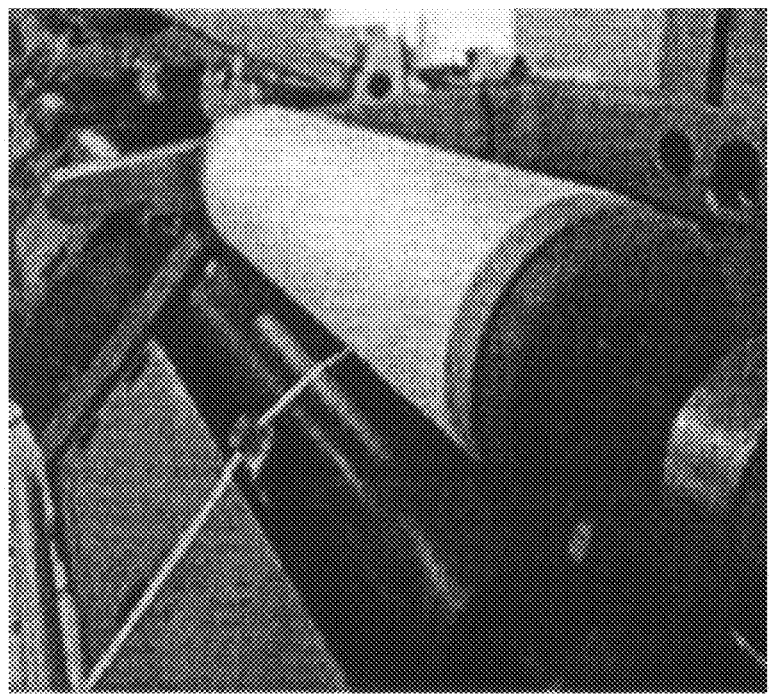
FIG. 8E is a photograph showing a second slitting process of the first slit roll-type nanofiber composite membrane.

As shown in FIG. 8E, the composite fiber yarn is produced by S-twist or Z-twist using a twisting machine or the like (S40).

A plurality of strands of the composite fiber tape yarn are right-twisted (S-twisted) or left-twisted (Z-twisted) through the twisting device to impart twisting to the composite fiber tape yarn. Here, it is necessary to perform twist turns per meter (T/M) with hard twisted yarn of 500 or less or extreme hard twisted yarn of 2500 or more to meet the kind of polymer and the end purpose.

In addition, as a method of applying tension to the composite fiber tape yarn, it is possible to impart tension by passing nanofiber tape yarn between an up-disk tensioner and a down-disk tensioner. Depending on the type of polymer, hot rolling or heat setting can be performed in a temperature range between the glass transition temperature (Tg) and the melting temperature (Tm).

The produced composite fiber yarn is subjected to a post-treatment so that the twist is not loosened or a strong stretching force is applied (S50).

That is, the produced composite fiber yarn is subjected to post-treatment such as hot rolling or heat setting so that the twist cannot be loosened or a strong stretching force can be imparted. As the stretching method, various methods such as hot rolling and cold rolling can be used, and it is preferable to use the heat setting in a temperature range in which the twist cannot be loosened depending on the material used. The preferred hot rolling and heat setting are carried out in a temperature range between the glass transition temperature (Tg) and the melting temperature (Tm) of the polymer used. Further, the hot-rolling and heat-setting processes can be carried out not only in the post-process of the composite false-twist but also in the previous process.

EXAMPLES (Example 1) Preparation of PVdF Nanofiber Web and Lamination of the PVdF Nanofiber Web to a Porous Nonwoven Fabric PVdF (polyvinylidene fluoride) was used as a polymer material, and dissolved in a solvent of DMAc:Acetone=7:3 so as to be 15 wt %, thereby preparing a spinning solution.

The spinning solution was moved to the spin pack of the electrospinning apparatus so that the applied voltage was 100 kV, the distance between the spinning nozzle and the collector was 20 cm, and the discharged amount was 20 μl/hole, and electrospinning was performed in a spinning atmosphere with a relative humidity of 60%, and thus a nanofiber web having a weight of 3 gsm and a pore size of 1 μm was prepared.

The thus obtained nanofiber web was calendered at 150° C. under 1 kgf/cm² to form a fixed pore structure by forming a bond between the nanofibers, and laminated to a PP/PE spunbond nonwoven fabric at 130° C. and under 1 Kgf/cm² to produce a nanofiber composite membrane. The nonwoven fabric used was a PP/PE spunbond having a thickness of 160 μm and a weight of 40 gsm, to obtain a composite nanofiber roll having a width of 1.7 m and a length of 300 m as shown in FIG. 8A.

In order to analyze the basic characteristics of the nanofiber composite membrane material obtained from Example 1, a pore size distribution was measured according to ASTM E1294 standard, by using a capillary porosimeter manufactured by Porous Materials, Inc., and air permeability was measured according to ASTM D737 standard, by using FX3300 (trade name) manufactured by TEXTEST and the results are shown in Tables 1 and 2, respectively.

Particularly, in order to compare the basic characteristics of the nanofiber composite membrane, a PVdF membrane (Comparative Example 1) having a pore size of 1 μm prepared by phase-separation of Merck-Millipore, and meltblown media (Comparative Example 2) having a pore size of 1 μm of Hollingsworth & Vose Company were used as control groups.

TABLE 1

| | Pore size, μm | |
|---|---|---|
| | Average pore | Maximum pore |
| Example 1 | 1.0 | 1.3 |
| Comparative Example 1 | 1.0 | 1.7 |
| Comparative Example 2 | 2.1 | 5.6 |

TABLE 2

| | Air permeability (cfm@125 Pa) |
|---|---|
| Example 1 | 2.5 |
| Comparative Example 1 | 0.8 |
| Comparative Example 2 | 0.7 |

As shown in Table 1, the nanofiber composite membrane of Example 1 according to the present invention had an average pore size of 1.0 μm and a maximum pore size of 1.3 μm, and appeared to have a narrow distribution of the pore sizes, which were equivalent to or larger than the pore sizes of the commercialized filter membranes of Comparative Examples 1 and 2.

Also, as shown in Table 2, the nanofiber composite membrane of Example 1 according to the present invention had been measured as an air permeability of 2.5 cfm@125 Pa and appeared to have a very excellent air permeability as compared with the commercialized filter membranes of Comparative Examples 1 and 2.

(Example 2) Production of Composite Fiber Tape Yarn

The composite fiber roll produced by the method of Example 1 was subjected to primary slitting so as to have a width of 5 mm as shown in FIG. 8B, and then subjected to secondary slitting so as to have a width of 3 mm as shown in FIG. 8E to obtain composite nanofiber tape yarn.

Scanning electron microscope (SEM) images of the composite fiber tape yarn obtained by the method of Example 2 are shown in FIGS. 8C and 8D. As shown in FIG. 8C, it was confirmed that the average diameter of the PVdF nanofibers was about 300 nm on the surface, and that the PVdF nanofibers were formed as the first grade of the average pore as in the PMI analysis in Example 1. In addition, as shown in FIG. 8D, the SEM images of the PE/PP spunbond nonwoven fabric complexed with nanofibers showed that polyolefin fibers having a diameter of 10 μm or so were randomly fused between the fibers, and thus it could be confirmed that large pores were formed.

Figure 9A:
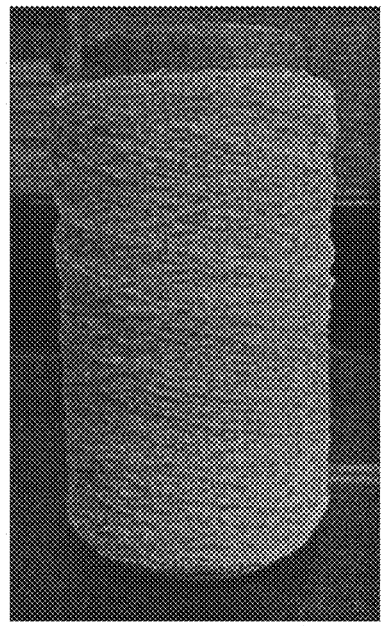
FIG. 9A is a photograph of composite fiber yarn wound on a roll.

The composite nanofiber tape yarn prepared by the method of Example 2 was Z-twisted so as to have the twist turns per meter (T/M) per minute of 700 using a 2 for 1 twister to produce composite fiber yarn composed of composite nanofibers. FIG. 9A shows a photograph of composite fiber yarn, and FIG. 9B shows a SEM image of the surface of the composite fiber yarn.

Figure 9B:
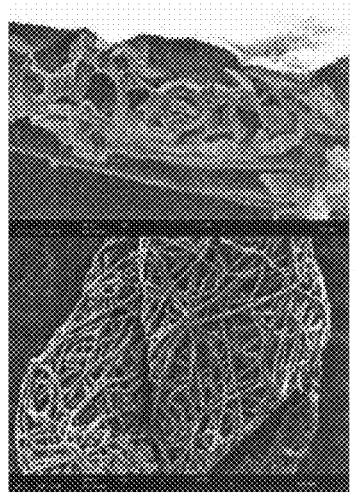
FIG. 9B is a photograph of composite fiber yarn taken by a scanning electron microscope.

As shown in the photograph of FIG. 9B, it was confirmed that the 300 μm grade diameter nanofibers and the 10 μm grade micro fibers were randomly mixed and twisted, and that various types of pores coexist.

(Example 3) Winding Composite Fiber Yarn on a Core

Figure 10:
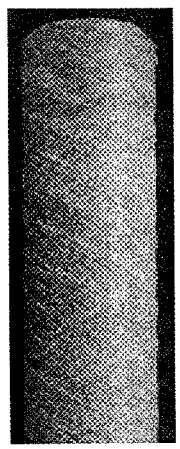
FIG. 10 is a photograph of the composite fiber yarn wound around a core according to an embodiment of the present invention.
Figure 11:
FIG. 11 is a photograph showing a cartridge filter according to an embodiment of the present invention is mounted on a housing.

A 2-layer type filter element as shown in FIG. 10 was fabricated by winding composite fiber yarn prepared by the method of Example 2 on a cylindrical core wound with 50% of PP tow yarn. Here, the filter element was designed to have an inner diameter of 30 mm, an outer diameter of 63 mm, and a length of 250 mm. The fabricated filter element was coupled with a housing made of PP material as shown in FIG. 11 to fabricate a cartridge filter. Filtration was performed according to the ASTM F795 standard, and the flow rate and differential pressure across the filter media were measured. The measured results are shown in Table 3. Particularly, in order to evaluate the basic characteristics of the cartridge filter based on the nanofiber composite yarn, a product of a domestic S company (Comparative Example 3) manufactured by the same standard with a 100% PP tow yarn as a control group was comparatively analyzed.

TABLE 3

| Measured flow rate (/min) | Measured differential pressure (kg/cm$^2$) | | | | | |
|---|---|---|---|---|---|---|
| | Example 3 | | | Comparative Example 3 | | |
| | #1 | #2 | Ave. | #1 | #2 | Ave. |
| 5 | 0.02 | 0.02 | 0.02 | 0.00 | 0.02 | 0.01 |
| 10 | 0.06 | 0.06 | 0.06 | 0.04 | 0.06 | 0.05 |
| 15 | 0.14 | 0.15 | 0.14 | 0.10 | 0.13 | 0.11 |
| 20 | 0.24 | 0.25 | 0.24 | 0.20 | 0.21 | 0.20 |
| 25 | 0.40 | 0.38 | 0.39 | 0.33 | 0.32 | 0.32 |
| 30 | 0.51 | 0.51 | 0.51 | 0.42 | 0.43 | 0.43 |

As shown in Table 3, in the case of comparing the cartridge filter of Example 3 according to the present invention and that of Comparative Example 3, the pressure strengthening according to the flow rate was quite a little excellent in Comparative Example 3 in comparison with Example 3. These results are expected to be due to a wider surface area in the case of the 2-layer type Example 3 than in Comparative Example 3.

In addition, Table 4 shows the relationship between the amount of collected cake and the differential pressure according to the measured flow rate. The test flow rate was 15 L/min, once/30 g/5 min, and input contaminant particles were Carborundum #600.

TABLE 4

| | Measured differential pressure (kg/cm$^2$) | |
|---|---|---|
| Input (g) | Example 3 | Comparative Example 3 |
| 0 | 0.12 | 0.10 |
| 10 | 0.15 | 0.10 |
| 20 | 0.17 | 0.10 |
| 30 | 0.22 | 0.11 |
| 60 | 0.35 | 0.11 |
| 90 | 0.51 | 0.12 |
| 120 | 0.67 | 0.13 |

As shown in Table 4, in the case of comparing the cartridge filter of Example 3 according to the present invention and that of Comparative Example 3, the pressure strengthening according to the amount of collected cake was a little excellent in Comparative Example 3 in comparison with Example 3. These results can be interpreted as a result of the presence of more pores in the case of Example 3 of the 2-layer type, which is also consistent with the results of Table 3 above.

Figure 12:
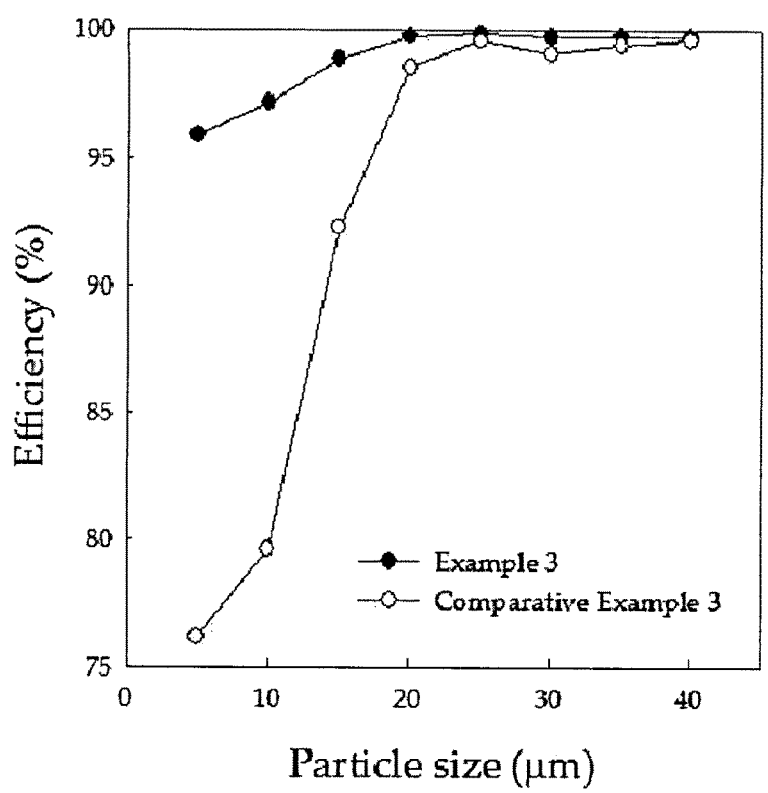
FIG. 12 is a graph showing the filter efficiency according to the particle size of a cartridge filter according to an embodiment of the present invention.

The filter efficiencies according to the measured particle sizes are shown in Tables 5 and the graph of FIG. 12. As shown in Table 5, it was found that the filter efficiency of Example 3 was superior to that of Comparative Example 3 as a whole. These results are interpreted as a result of the fact that Example 3 containing the composite nanofiber fiber yarn has a larger surface area, in comparison with Comparative Example 3. In particular, as shown in the graph of FIG. 12, it was confirmed that the case of Example 3 including the composite nanofiber fiber yarn exhibited remarkably excellent filter efficiency as compared with Comparative Example 3 in the case of fine particles having a particle size of less than 20 μm. These results show that, when a multilayer cartridge filter is employed as in Example 3, it is possible to simultaneously remove particles of various sizes with a single filter, and the energy and space required for a filter operation to be used as a process filter can be remarkably lowered.

TABLE 5

| | Measured differential pressure (kg/cm$^2$) | | | | | |
|---|---|---|---|---|---|---|
| | Example 3 | | | Comparative Example 3 | | |
| Measured channel | Up | Down | Effi. (%) | Up | Down | Effi. (%) |
| 5 | 16028.00 | 650.30 | 95.94 | 18791.00 | 4476.30 | 76.18 |
| 10 | 14990.00 | 420.67 | 97.19 | 18744.00 | 3826.00 | 79.59 |
| 15 | 11708.00 | 135.73 | 98.84 | 18706.00 | 1433.30 | 92.34 |
| 20 | 6676.70 | 16.93 | 99.75 | 18665.00 | 275.83 | 98.52 |
| 25 | 3258.40 | 5.73 | 99.82 | 18552.00 | 81.87 | 99.56 |
| 30 | 1462.70 | 4.07 | 99.72 | 4764.00 | 44.17 | 99.07 |
| 35 | 567.20 | 1.50 | 99.74 | 4681.40 | 28.30 | 99.40 |
| 40 | 210.30 | 0.60 | 99.71 | 3997.40 | 17.37 | 99.57 |

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is applied to a cartridge filter which is widely used as a process filter in all industrial fields such as electronic materials such as semiconductors, automobile industry, food and beverage production, various pigment and paint industries, wastewater, water purification, etc., in which precise filtration is possible by using, as a filter medium, composite fiber yarn manufactured by laminating a nanofiber web produced by an electrospinning method on a porous substrate.

What is claimed is:

1. A cartridge filter using nanofiber composite fiber yarn, the cartridge filter comprising:
    a core having a plurality of holes through which a liquid is capable of passing; and
    a filter medium wound around the core to collect an object to be filtered contained in the liquid,
    wherein the filter medium comprises: a fiber yarn wound on an outer surface of the core to form a porous member on the outer surface of the core; and a composite fiber yarn wound on an outer surface of the porous member,
    wherein the composite fiber yarn is formed of a plurality of twisted composite tape yarns, each of the composite tape yarns is formed of a porous non-woven fabric and a nanofiber web laminated on the porous non-woven fabric, and the nanofiber web is formed of accumulated nanofibers electrospun on the porous non-woven fabric, and
    wherein the fiber yarn is formed of an acrylic fiber yarn.

2. The cartridge filter of claim 1, wherein the filter medium has an average pore size gradually increasing towards the core.

3. The cartridge filter of claim 1, wherein the filter medium further comprises: a first layer of porous non-woven fabric between the porous member and the composite fiber yarn.

4. The cartridge filter of claim 3, wherein the first layer of porous nonwoven fabric is a spun bond nonwoven fabric or a thermal bond nonwoven fabric formed of electrospun PP, PE, PP/PE, or PET.

5. The cartridge filter of claim 3, wherein the filter medium further comprises: a second layer of porous non-woven fabric between the first layer of porous non-woven fabric and the composite fiber yarn.

6. The cartridge filter of claim 5, wherein the second layer of porous nonwoven fabric is a meltblown nonwoven fabric formed of electrospun synthetic polymer.

* * * * *